United States Patent [19] [11] 3,886,552
Gluck [45] May 27, 1975

[54] SYNCHRONIZATION OF SPLIT SITE LANDING SYSTEMS

[75] Inventor: Adolph M. Gluck, Woodcliff Lake, N.J.

[73] Assignee: The Singer Company, Little Falls, N.J.

[22] Filed: Apr. 8, 1974

[21] Appl. No.: 458,778

[52] U.S. Cl.......... 343/108 R; 178/69.5 R; 325/58; 343/107
[51] Int. Cl............................................. G01s 1/16
[58] Field of Search.......... 343/107, 108 R; 325/58; 178/69.5 R

[56] References Cited
UNITED STATES PATENTS
2,663,017  12/1953  Charlton .................. 343/108 R
3,730,994   5/1973  Terry et al. ............... 178/69.5 R Primary Examiner—Maynard R. Wilbur
Assistant Examiner—Richard E. Berger
Attorney, Agent, or Firm—T. W. Kennedy

[57] ABSTRACT

An improved arrangement for synchronization split site landing systems of the type wherein azimuth and elevation signals are transmitted by different antennas at separate locations in which existing telephone lines and equipment are used with a synchronizing signal of extremely narrow band width provided in the upper 300 cycles of a standard 3,000 cycle voice channel with the signal transmitted over the conventional telephone lines to both the azimuth and elevation sites where it is demodulated and decoded to provide synchronized switching pulse trains to the two antennas.

10 Claims, 3 Drawing Figures

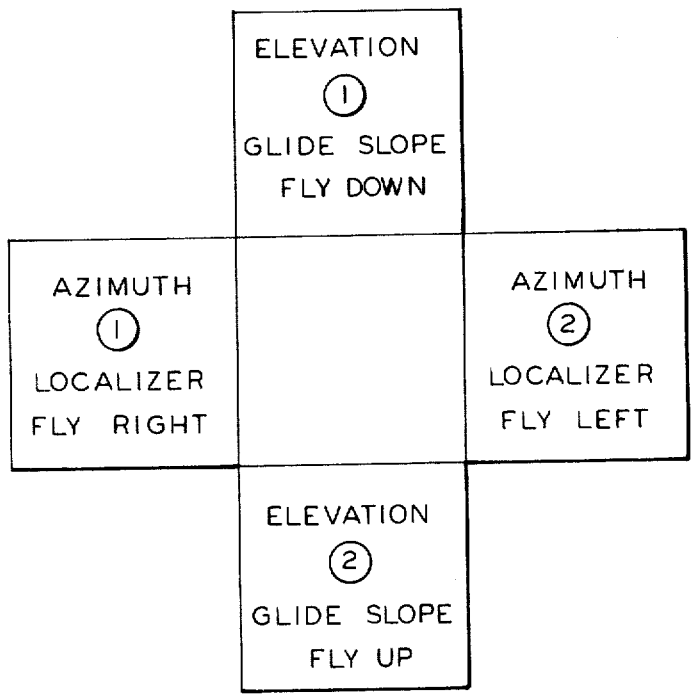
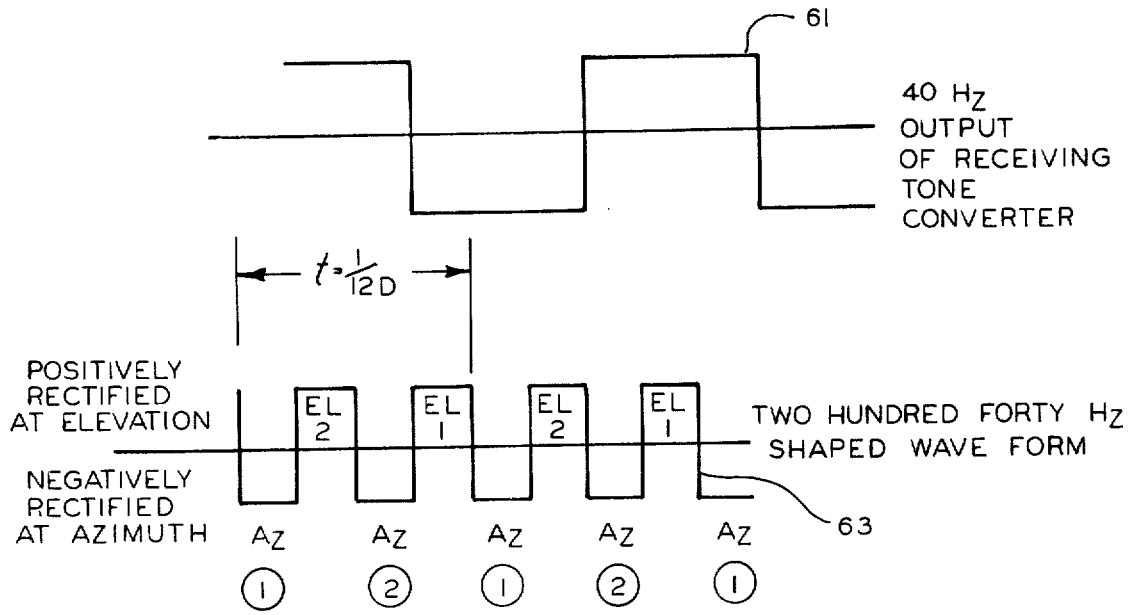
FIG. 3

3,886,552

SYNCHRONIZATION OF SPLIT SITE LANDING SYSTEMS

BACKGROUND OF THE INVENTION

This invention relates to aircraft landing systems in general, and more particularly to an improved synchronizing arrangement for split site landing systems.

Landing systems used for the guidance of aircraft to a runway under low visibility conditions have been developed in which four switched beams are transmitted in sequence. An upper elevation beam is transmitted, then typically a left azimuth beam, then a lower elevation beam and then a right azimuth beam. This sequence continues as long as the system is operating. The aircraft using the landing system can tell, by which of the beams he intercepts, whether he is too high, too low, left or right. For example, if he intercepts the upper elevation beam he is too high and must fly down. Similarly, if he intercepts the right azimuth beam he is too far to the right and must fly left. One installation of this type is known as the TALAR system and is produced by the Kearfott Division of the Singer Company. In systems of this nature, azimuth beams and elevation beams are transmitted by separate antennas at different sites which are often separated from each other with site separations of up to 3 miles possible. For reliable system operation, only one of the azimuth or elevation antennas can be transmitting at a given time. As a result, the radiation from the two antennas must be synchronized. The present method of synchronization uses a complicated, high cost cable installation. Coaxial multiple wire cables are used to transmit the coded signals from one site to the other, i.e., azimuth to elevation and elevation to azimuth, in order to allow each site to transmit in proper sequence. In addition, each site must also contain receiving equipment for decoding the transmission from the other site and to sequence the enabling of beam scanning and RF transmission. This additional complex equipment decreases the overall reliability of the landing system.

Thus, it can be seen that there is a need for an improved lower cost system which will operate more reliably than the system presently in use.

SUMMARY OF THE INVENTION

The present invention provides such a system in which existing telephone lines and standard telephone type equipment are used. A synchronizing signal of extremely narrow band width is transmitted in the upper 300 cycles of a standard 3,000 cycle voice channel. The use of standard frequency division voice band telephone equipment provides a highly reliable channel for the synchronizing signal on an existing telephone installation without the need for additional cables or additional installation cost.

BRIEF DESCRIPTION OF THE DRAWINGS

FIG. 3 is a diagram illustrating the beam stepping pattern, and a waveform diagram illustrating the relationship between the generated synchronizing waveforms and the beam stepping pattern.

DETAILED DESCRIPTION OF THE PREFERRED EMBODIMENT

Figure 1:
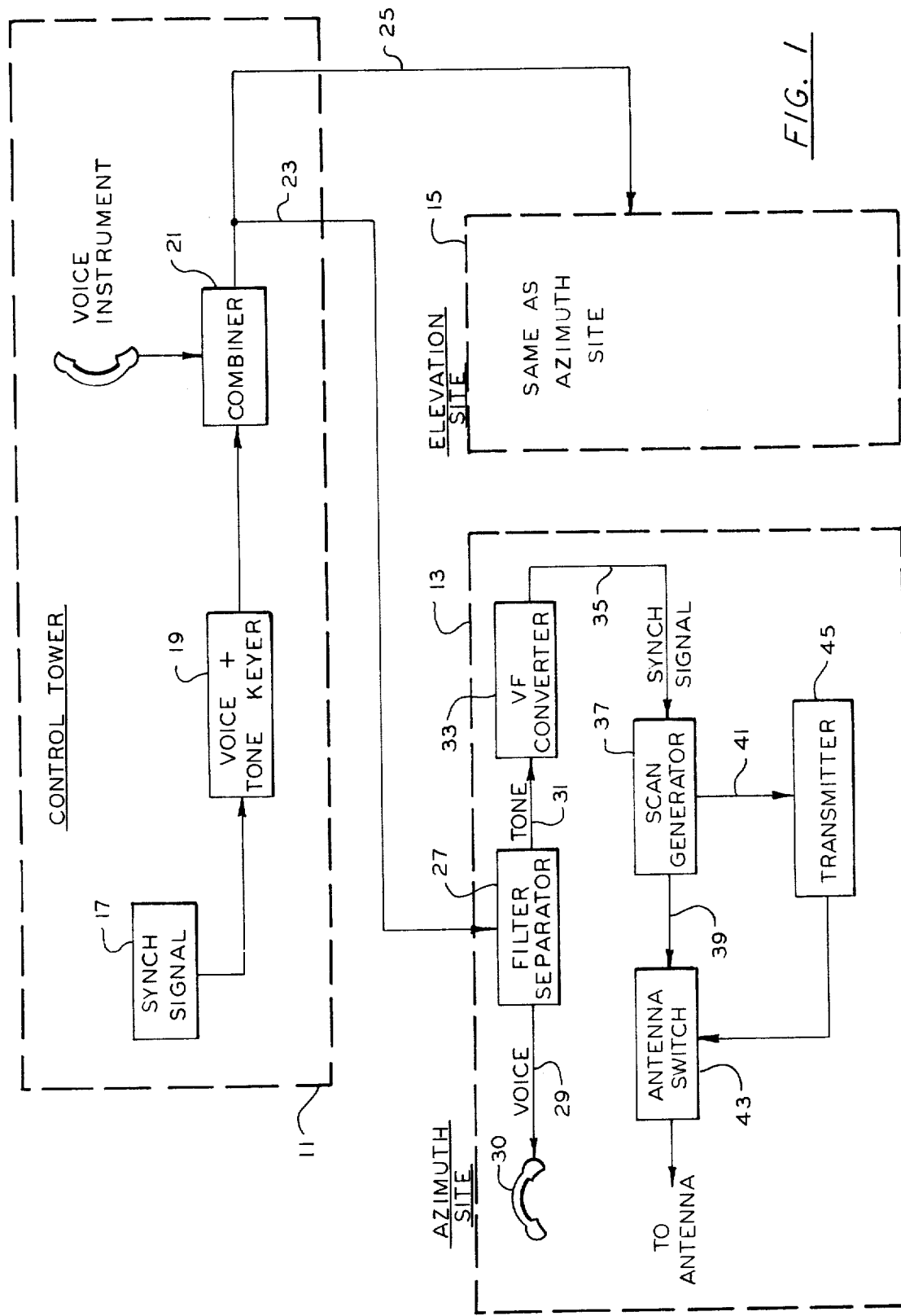
FIG. 1 is an overall block diagram illustrating an azimuth site and elevation site being supplied with signals from a common location such as a control tower.

In the embodiment illustrated on FIG. 1, a system wherein synchronizing signals generated at a control tower area 11 or the like, are provided to an azimuth site 13 and an elevation site 15 is shown. It will be recognized that the transmitting equipment can also be located at one or the other sites and the sync signal transmitted to the other site. For example, the equipment shown as being located in the control tower 11 could equally well be located at the elevation site 15. In that case, the sync signals developed could be used directly at the elevation site without transmission. At the transmitting site, a sync signal generator 17 such as a crystal clock, generates a square wave at, for example 40 Hz. It will be recognized that this frequency is not critical and will be dictated by the particular system requirements. The sync signal is supplied to a voice and tone keyer 19 where it is placed in the upper 300 cycles of a standard voice channel. The output of block 19 is provided to a combiner 21 where the sync signal and any voice signals are combined for transmission over lines 23 and 25 respectively to the azimuth site 13 and elevation site 15. Only the azimuth site 13 is shown in detail with the hardware in the elevation site 15 being identical thereto. The input on line 23 is first provided to a filter separator 27 where the voice signal and tone signal are separated with the voice signal being provided on a line 29 to an appropriate voice instrument 30 and the tone signal being provided on line 31 to a tone converter 33. The tone converter 33 will demodulate the signal in conventional fashion. The sync signal on line 35 at 40 Hz will then be provided to a scan generator 37 containing a frequency doubler and frequency tripler to thereby provide outputs at 240 Hz on lines 39 and 41. These are provided respectively to the antenna switch 43 and the transmitter 45 with the one signal being used to switch the antenna between its right and left transmitting positions and the other being used to key the transmitter 45.

Figure 2:
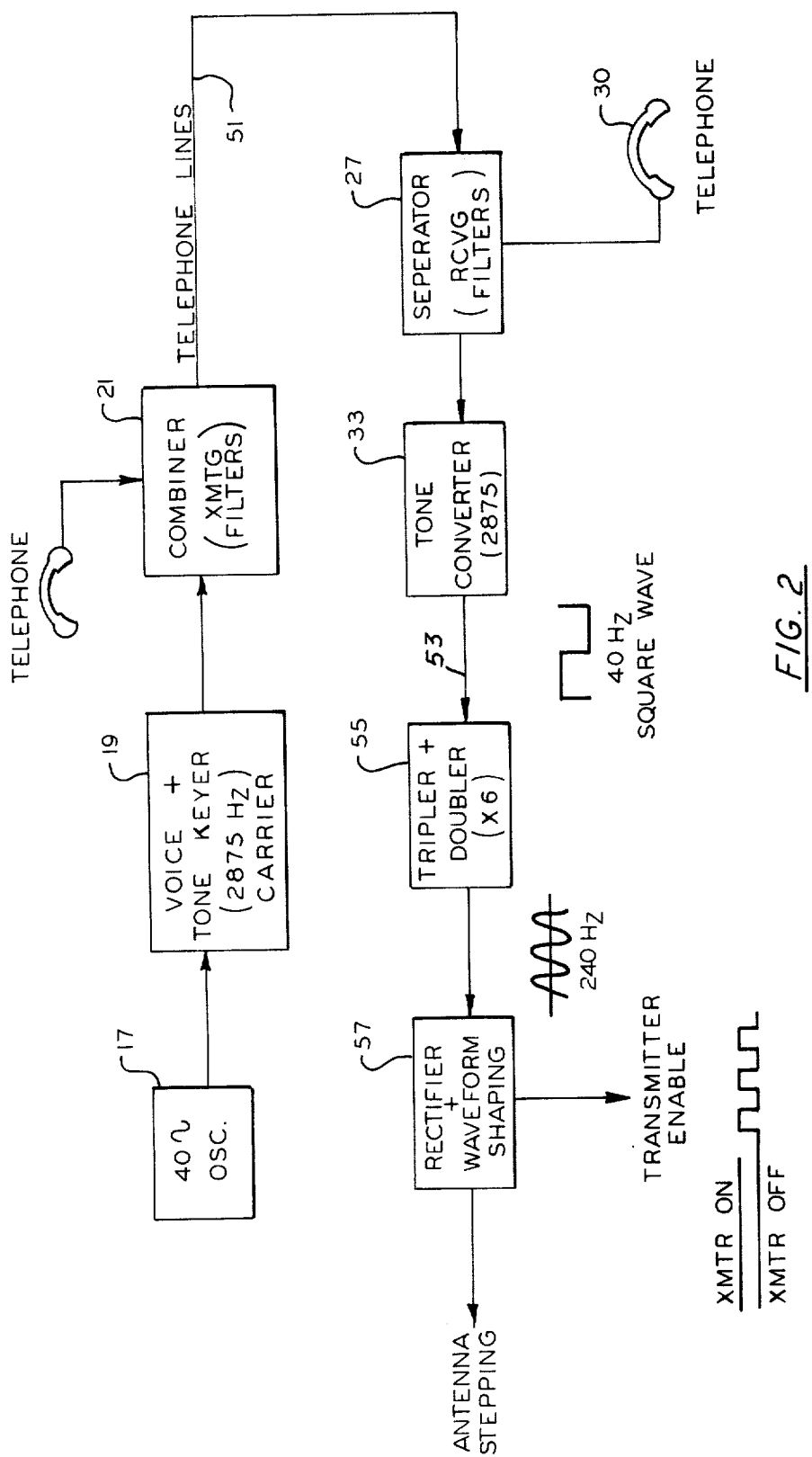
FIG. 2 is a more detailed block diagram of the transmitting and receiving equipment of FIG. 1.

FIG. 2 shows the basic elements of the system of FIG. 1 in slightly more detail. Thus, in the preferred embodiment, the sync signal generator 17 is designated as a 40 Hz oscillator. Its output is provided to a voice and tone keyer 19 which, in the preferred embodiment operates at 2,875 Hz. The output of the voice and tone keyer is provided to a combiner 21 which includes band limiting filters to form a composite analog signal for transmission over a single carrier path or telephone circuit. The voice and tone keyer 19 and combiner 21 may be obtained from Singer Telesignal Corporation of Woodbury, Long Island and, is referred to as the Singer/Telesignal model 808 series Speech Plus Data Multiplex Terminal. The operation of this equipment is fully disclosed in the product data sheet PDD 334 published by Singer Telesignal. The combined voice and data signals are transmitted over a telephone line 51 to the receiving equipment which includes first the filter separator 27 which divides the signal into a voice signal which is then provided to a voice instrument 30. The separated signal which will include the tone modulated at 40 Hz will be demodulated in the tone converter 33. The functions of blocks 27 and 33 are formed by demultiplexing equipment sold under the same model number as the above described Speech Plus Data Multiplex Unit. The resulting signal out of the tone converter 33 will be a 40 Hz square wave essentially identical to that provided at the input by the 40 Hz oscillator 17. This output on line 53 is provided to a tripler and doubler circuit to obtain a multiplication by six. The frequency trippler may comprise a squaring circuit which will provide a squared off waveform at its output, which waveform will contain the required harmonics and which is then provided to a circuit tuned to three times the frequency of the input, i.e., 120 Hz. The output of the trippler will thus be a sine wave at three times the original frequency. The 120 Hz sine wave resulting at the output of the trippler is then provided to the doubler. In well known fashion, the frequency doubler may comprise a full wave rectifier having its output connected to a circuit tuned to twice the input frequency. The doubler output which will be close to a square wave is then provided to a rectifier and waveform shaper 57 wherein it is converted into a 240 Hz square wave. That is, it is rectified so that only the positive or negative half cycles are used and those half cycles then shaped to provide square waves. Such shaping may be done in conventional fashion using Schmidt triggers or the like.

The elevation site can use the positively rectified signal and the azimuth site the negatively rectified signal as illustrated on FIG. 3. Shown thereon, is the 40 Hz output of the oscillator 17 of FIGS. 1 and 2 and designated 61 along with the 240 Hz signal 63 which is obtained from the rectifier and waveform shaper 57. Also illustrated on FIG. 3 is the transmitting pattern of the two antennas. Thus, as shown on the first negative pulse designated AZ1, the azimuth antenna will radiate to the left giving an indication of "fly right." On the next positive pulse labeled EL2, the elevation will radiate in a downward direction to give an indication to "fly-up." This pulse is designated as AZ2. And on the next pulse designated EL1, the elevation antenna will radiate in the upward direction to give the "fly down" indication. The cycle then repeats itself and will do so continuously as long as the system is in operation. Through the use of the same basic synchronizing signal and its division, after appropriate multiplication, into positive and negative pulses, proper sequence of transmitting is maintained without any danger of two antennas radiating at the same time.

Aside from the fact that the present invention offers advantages in its simplicity and the commercial availability of the equipment used and in the ability to use telephone voice channels rather than costly custom cabling for site synchronization, this system provides other advantages. The synchronization technique can be easily adapted to variable data rates and as noted above, is capable of being set up so that one site is synchronized from the other or so that both sites are synchronized from a control tower or the like.

Thus, an improved site synchronization system for split site landing systems has been shown. Although specific embodiments have been illustrated and described, it will be obvious to those skilled in the art that various modifications may be made without departing from the spirit of the invention which is intended to be limited solely by the appended claims.

What is claimed is:

1. An improved synchronization system for a split site landing system comprising:

a. means to generate a bipolar synchronizing signal;
   b. means to encode said synchronizing signal for transmission over a telephone line;
   c. a telephone line coupling said encoded signal to at least one of the sites of the split site landing system;
   d. means to decode the signal on said line;
   e. means to rectify said decoded synchronizing signal so as to use only one of the positive and negative cycles of said synchronizing signal; and
   f. means to provide said rectified signal as an antenna stepping signal and transmitter enable signal to the antenna at said site.

2. Apparatus according to claim 1 wherein an azimuth site and an elevation site are installed and wherein means to rectify are installed at each of said sites with said means to rectify at one site positively rectifying the synchronizing signal and at said other site negatively rectifying said synchronizing signal.

3. Apparatus according to claim 1 and further including means to combine said encoded synchronizing signal with a voice signal, said means being installed between said encoder and said telephone line and means at the other end of said telephone line for separating said encoded synchronization signal.

4. Apparatus according to claim 1 wherein said means for generating said synchronization signal generates a signal at a frequency which is less than the antenna stepping frequency and further including means between said decoding means and said rectifying means for multiplying said synchronizing signal to obtain a signal of higher frequency.

5. Apparatus according to claim 4 wherein said stepping frequency is six times said generated frequency and wherein said multiplying means comprise a frequency doubler and a frequency tripler coupled in series.

6. Apparatus according to claim 4 wherein an azimuth site and an elevation site are installed and wherein said elevation site and azimuth site are both provided with synchronizing signals from a third common site and wherein said means for generating and means for encoding are installed at said third site for providing synchronizing signals to said azimuth and elevation sites with each of said azimuth and elevation sites containing means for encoding and means for rectifying.

7. Apparatus according to claim 6 wherein said means for rectifying positively rectify the synchronizing signal at one site and negatively rectify said synchronizing signal at said other site.

8. Apparatus according to claim 7 and further including means to combine said encoded synchronizing signal with a voice signal, said means being installed between said encoder and said telephone line and means at the other end of said telephone line for separating said encoded synchronization signal.

9. Apparatus according to claim 8 wherein said means for generating said synchronization signal generates a signal at a frequency which is less than the antenna stepping frequency and further including means between said decoding means and said rectifying means for multiplying said synchronizing signal to obtain a signal of higher frequency.

10. The invention according to claim 1 wherein said means for generating and means for encoding are installed at one of said sites with the output of said encoding means being provided by said telephone line to said other site.

* * * * *